(12) United States Patent
Scholeno

(10) Patent No.: US 9,711,901 B2
(45) Date of Patent: Jul. 18, 2017

(54) ELECTRICAL CONNECTOR ASSEMBLY INCLUDING POLARIZATION MEMBER

(71) Applicant: FCI Americas Technology LLC, Carson City, NV (US)

(72) Inventor: Michael Scholeno, Etters, PA (US)

(73) Assignees: FCI Americas Technology LLC, Carson City, NV (US); FCI USA LLC, Etters, PA (US)

( * ) Notice: Subject to any disclaimer, the term of this patent is extended or adjusted under 35 U.S.C. 154(b) by 0 days.

(21) Appl. No.: 15/023,134

(22) PCT Filed: Sep. 10, 2014

(86) PCT No.: PCT/US2014/054924
§ 371 (c)(1),
(2) Date: Mar. 18, 2016

(87) PCT Pub. No.: WO2015/041907
PCT Pub. Date: Mar. 26, 2015

(65) Prior Publication Data
US 2016/0233615 A1 Aug. 11, 2016

Related U.S. Application Data

(60) Provisional application No. 61/879,368, filed on Sep. 18, 2013.

(51) Int. Cl.
*H01R 13/648* (2006.01)
*H01R 13/64* (2006.01)
(Continued)

(52) U.S. Cl.
CPC .......... *H01R 13/64* (2013.01); *G02B 6/4277* (2013.01); *G02B 6/4284* (2013.01);
(Continued)

(58) Field of Classification Search
CPC ...... H01R 13/64; H01R 13/659; H01R 43/26; H01R 13/645; H01R 12/712; H01R 24/60;
(Continued)

(56) References Cited

U.S. PATENT DOCUMENTS 5,848,914 A * 12/1998 Lang .................. H01R 13/6592
439/607.47
8,366,493 B2 * 2/2013 Nakamura ......... H01R 13/4223
439/752

(Continued)

FOREIGN PATENT DOCUMENTS

JP  2008-152988 A  7/2008
KR  20-0361812 Y1  9/2004

OTHER PUBLICATIONS

International Search Report and Written Opinion for International Application No. PCT/US2014/054924 dated Dec. 9, 2014.

(Continued)

*Primary Examiner* — Khiem Nguyen
(74) *Attorney, Agent, or Firm* — Wolf, Greenfield & Sacks, P.C.

(57) ABSTRACT

An electrical connector assembly can include a polarization member that is configured to prevent first and second electrical connectors from being mated to each other in an incorrect orientation. The polarization member abuts the first electrical connector such that the first electrical connector provides structural support to the polarization member when the second electrical contacts the polarization member. The polarization member is received by the second electrical connector when the second electrical connector is mated to the first electrical connector in a predetermined orientation.

19 Claims, 7 Drawing Sheets

(51) Int. Cl.
*H01R 12/71* (2011.01)
*H01R 13/645* (2006.01)
*H01R 13/6582* (2011.01)
*G02B 6/42* (2006.01)
*H01R 13/659* (2011.01)
*H01R 43/26* (2006.01)
*H01R 13/518* (2006.01)
*H01R 13/633* (2006.01)
*H01R 24/60* (2011.01)

(52) U.S. Cl.
CPC ......... *G02B 6/4293* (2013.01); *H01R 12/712* (2013.01); *H01R 13/645* (2013.01); *H01R 13/659* (2013.01); *H01R 13/6582* (2013.01); *H01R 43/26* (2013.01); *H01R 13/518* (2013.01); *H01R 13/6335* (2013.01); *H01R 24/60* (2013.01)

(58) Field of Classification Search
CPC  H01R 13/6335; G02B 6/4293; G02B 6/4284; G02B 6/4277

USPC ............................................ 439/607.25, 680
See application file for complete search history.

(56) References Cited

U.S. PATENT DOCUMENTS

| 2003/0003787 | A1* | 1/2003 | Bakker | H01R 13/4538 439/157 |
| 2012/0225574 | A1* | 9/2012 | Nakamura | H01R 13/4223 439/345 |
| 2012/0329299 | A1* | 12/2012 | Kitajima | H01R 12/716 439/147 |

OTHER PUBLICATIONS

International Preliminary Report on Patentability for International Application No. PCT/US2014/054924 dated Mar. 31, 2016.

\* cited by examiner

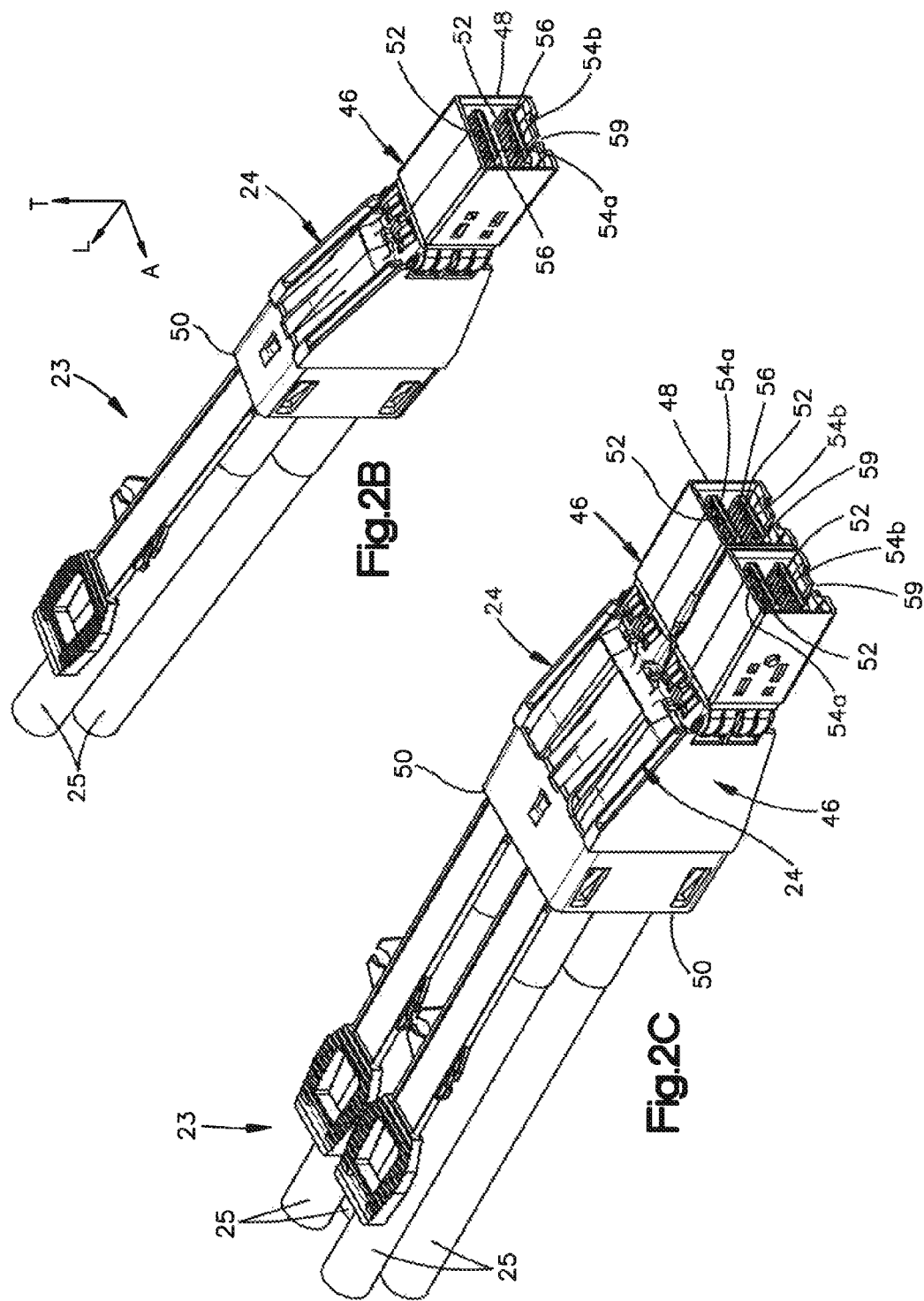

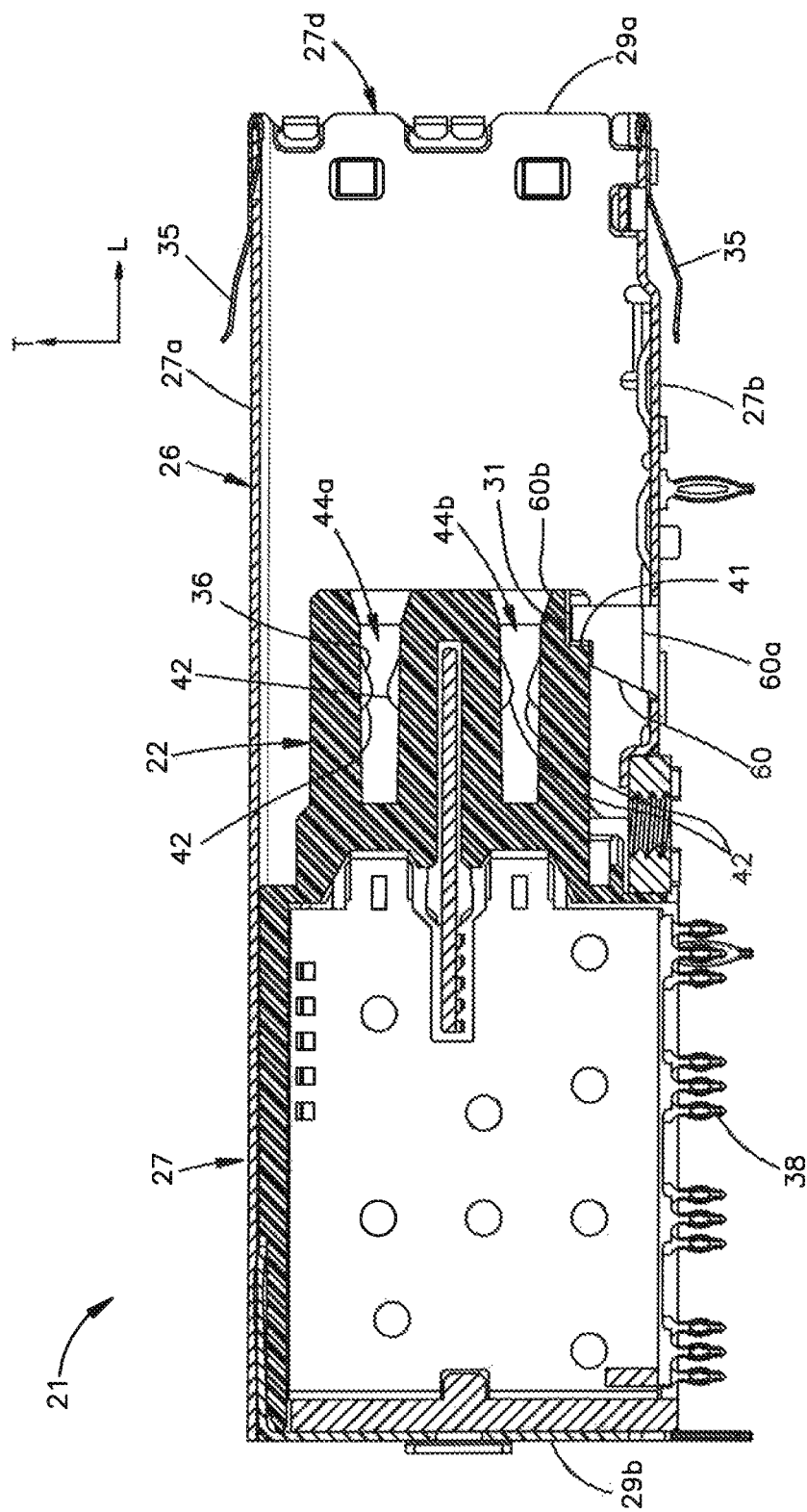

ELECTRICAL CONNECTOR ASSEMBLY INCLUDING POLARIZATION MEMBER

CROSS-REFERENCE TO RELATED APPLICATIONS

This application is the National Stage of International Application No. PCT/US2014/054924 filed Sep. 10, 2014, which claims the benefit of U.S. application No. 61/879,368, filed Sep. 18, 2013, the disclosures of which are incorporated herein by reference in their entireties.

BACKGROUND

Electrical connector assemblies include first and second electrical connectors that are configured to mate with each other so as to place the electrical connectors in electrical communication with each other. In the context of optic transceivers, the first electrical connector can be configured as a receptacle connector having a connector housing and a plurality of electrical conductors that are configured to be mounted to a complementary electrical component, such as a printed circuit board. The first electrical connector is configured to mate with the second electrical connector at mating portions of the electrical conductors of the first electrical connector. The second electrical connector can be configured as a plug that is configured to be placed in electrical communication with one or more optical cables, and can include printed one or more circuit boards at its mating interface. The first electrical connector receives the one or more printed circuit boards at the mating portions of its electrical conductors so as to place the one or more printed circuit boards in electrical communication with electrical conductors of the first electrical connector when the first and second electrical connectors are mated to each other. The electrical connector assembly can include an electromagnetic interference (EMI) shielding cage that is configured to at least partially surround the first and second electrical connectors when mated to each other. For instance, the cage can be supported relative to the first electrical connector, such that the second electrical connector is inserted into an opening defined by the cage to be mated with the first electrical connector.

It is desirable to provide a polarization member that interferes with the second electrical connector when the second electrical connector is inserted into the cage opening at an orientation other than the orientation that allows the first and second electrical connectors to mate as desired. One example of such a connector assembly is described in the SFF-8644 Specification, the disclosure of which is hereby incorporated by reference as if set forth in its entirety herein.

SUMMARY

In accordance with one embodiment, an electrical connector assembly includes a first electrical connector including a connector housing and a plurality of electrical conductors supported by the connector housing, the first electrical connector configured to be mated with a second electrical connector such that the first electrical connector moves relative to the second electrical connector along a forward mating direction. The electrical connector assembly can further include an EMI shielding cage that includes a cage body that at least substantially surrounds the connector housing, the EMI shielding cage including a polarization tab that extends from the cage body to a location that is aligned with the connector housing in a rearward direction that is opposite the forward mating direction. The polarization tab is positioned to be received by the second electrical connector when the second electrical connector is mated with the first electrical connector when in a predetermined orientation with respect to the first electrical connector, and is otherwise positioned to interfere with the housing of the second electrical connector so as to prevent the second electrical connector from mating with the first electrical connector when the second electrical connector is in an orientation other than the predetermined orientation with respect to the first electrical connector. The polarization tab defines two ends. One of the two ends is attached to the EMI shielding cage. The other of the two ends is aligned to be supported by the connector housing of the first electrical connector and may extend into a recess, slot, groove, or guide defined by the connector housing of the first electrical connector, and may further extend into a recess, slot, groove, or guide defined by the housing of the second electrical connector when the second electrical connector is mated with the first electrical connector in the predetermined orientation.

BRIEF DESCRIPTION OF THE DRAWINGS

The foregoing summary, as well as the following detailed description of an example embodiment of the application, will be better understood when read in conjunction with the appended drawings, in which there is shown in the drawings an example embodiment for the purposes of illustration. It should be understood, however, that the application is not limited to the precise arrangements and instrumentalities shown. In the drawings:

FIG. 2B is a perspective view of a second electrical connector of the electrical connector assembly;

FIG. 2C is a perspective view of a pair of second electrical connectors illustrated in FIG. 2B, but supported by a common housing body;

FIG. 3C is a sectional side elevation view showing the cage supported relative to the first electrical connector as illustrated in FIG. 3B.

DETAILED DESCRIPTION

Figure 1A:
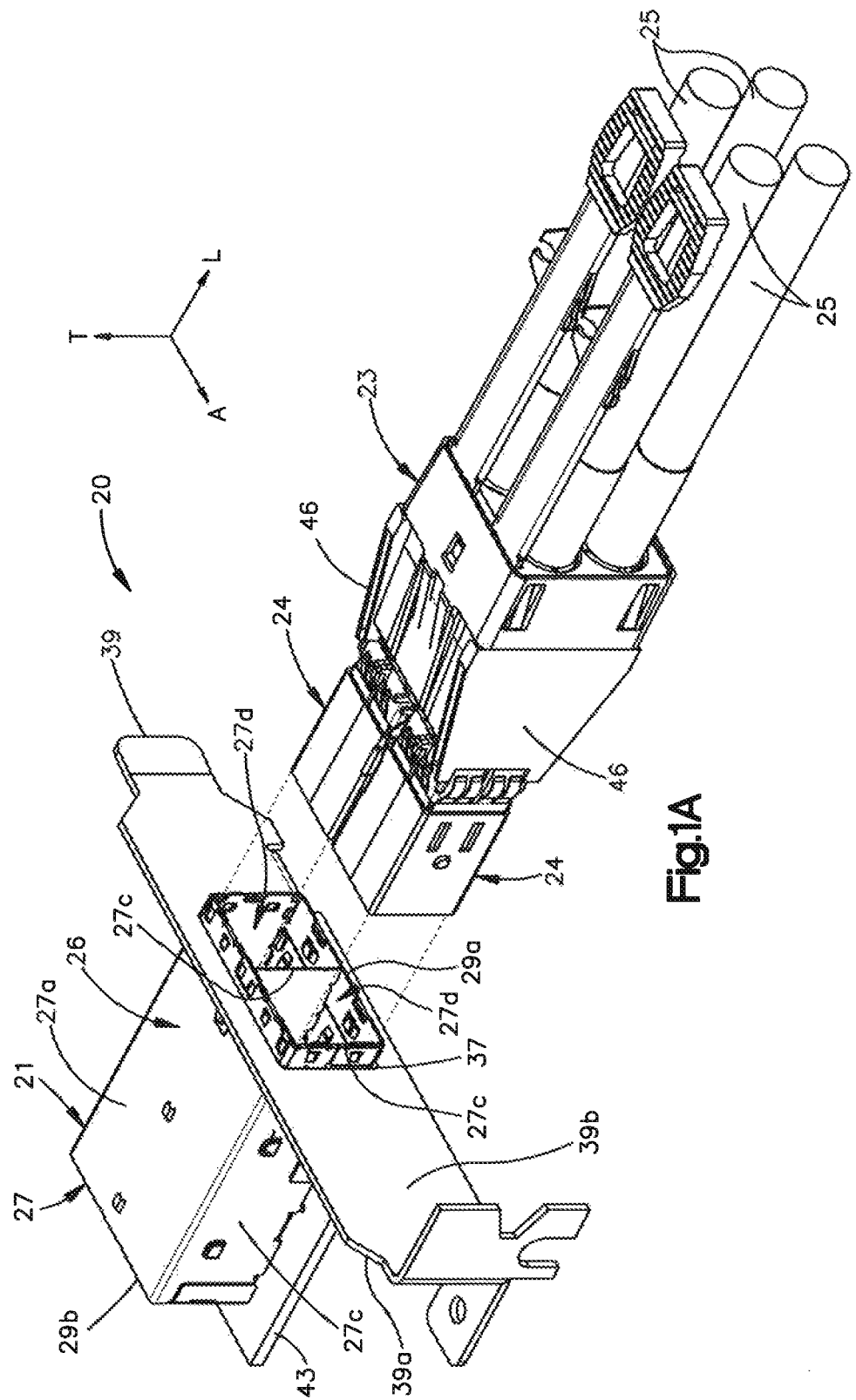
FIG. 1A is a perspective view of a first electrical component supported by a panel, the first electrical component including a first electrical connector mounted to a printed circuit board, and a cage that surrounds a mating interface of the first electrical connector.
Figure 1B:
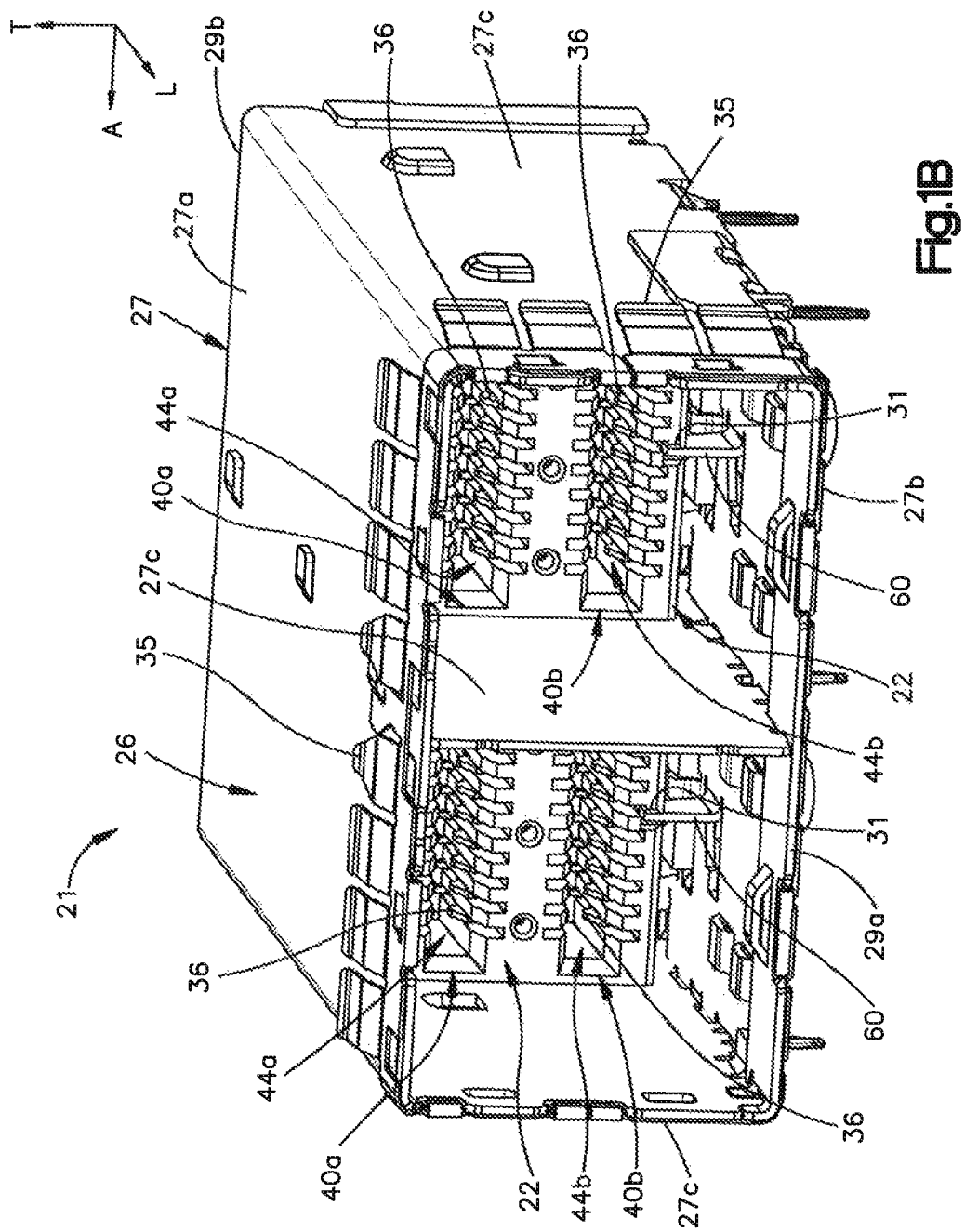
FIG. 1B is a perspective view of the first electrical connector illustrated in FIG. 1A.

Referring to FIGS. 1A-1B, an electrical connector assembly 20 can include an electrical component 21 that is configured to be mounted to a complementary electrical component, such as a substrate 43. The electrical connector assembly 20 can further include the substrate 43 in accordance with certain embodiments. The substrate 43 can be configured as a printed circuit board. The electrical component 21 can include at least one first electrical connector 22, and a cage 26 that at least substantially surrounds at least a portion of the at least one first electrical connector 22 so as to provide sufficient electromagnetic interference (EMI) shielding. It is appreciated that the cage 26 can define one or more apertures or perforations and provide sufficient EMI shielding, and can thus be said to substantially surround the at least a portion of the at least one first electrical connector 22. The cage 6 can be electrically conductive, and can be made of any suitable material as desired. For instance, the cage 26 can be metallic. Alternatively, the cage 26 can be non-metallic. In one example, the electrical component 21 can include a plurality of first electrical connectors 22, such as a pair of first electrical connectors 22. Each of the first electrical connectors 22 is configured to be mounted to the substrate 43.

The electrical connector assembly 20 can further include an electrical device 23 that includes at least one second electrical connector 24, that can be configured as an optical transceiver module. The electrical device 23 can further include at least one conductive cable 25 that extends out from the at least one second electrical connector 24. For instance, a plurality of conductive cables 25, for instance a pair of cables 25, can extend out from each of the at least one second electrical connectors 24 in communication with the respective at least one second electrical connector 24. For instance, the conductive cables 25 can be optically conductive cables and made from any suitable optically conductive material. Alternatively, the conductive cables 25 can be electrically conductive and made from any suitable electrical conductor, such as copper.

The electrical component 21 can include a plurality of cages 26, or a single cage 26 that is divided so as to at least substantially surround each of the at least one first electrical connector 22. For instance, the cage 26 can include a cage body 27 that defines an upper wall 27a. The cage body 27 can further include a base 27b spaced from the upper wall 27a along a transverse direction T. The cage body 27 can further include a plurality of side walls 27c that extend down from the upper wall 27a along the transverse direction. For instance, the side walls 26 can extend between the upper wall 27a and the base 27b. In one example, the side walls 27c can extend from the upper wall 27a to the base 27b. The side walls 27c can be spaced from each other along a lateral direction A that is perpendicular to the transverse direction T so as to define a retention void 27d between adjacent ones of the side walls 27c. first and second ones of the pair of first electrical connectors 22 can be disposed adjacent each other along the lateral direction A. The upper wall 27a and the base 27b can extend across each of the first and second ones of the pair of first electrical connectors 22 in the lateral direction A. It should be appreciated that the electrical connector assembly 20 can include any number of first electrical connectors 22 as desired, which can be substantially surrounded by the same cage 26 or different cages 26. The retention voids 27d can be partially defined by the upper wall 27a. The retention voids 27d can be partially defined by the base 27b. Each retention void 27d can further be partially defined between a pair of opposed side walls 27c. Thus, the upper wall 27a, the base 27b, and a pair of opposed side walls 27c can combine to define each retention void 27d. In certain embodiments wherein the cage 26 is divided, one or more of the side walls 27c can define a divider wall that is disposed between adjacent ones of the plurality of first electrical connectors 22.

The cage 26 defines a front end 29a and a rear end 29b spaced from the front end 29a along a longitudinal direction L that is perpendicular to each of the lateral direction A and the transverse direction T. The front end 29a can be said to be spaced from the rear end 29b in a forward direction. Conversely, the rear end 29b can be said to be spaced from the front end 29a in a rearward direction opposite the forward direction. Both the forward direction and the rearward direction can be oriented along the longitudinal direction L. At least a portion up to a substantial entirety of each of the first electrical connectors 22 can be disposed in respective ones of the retention voids 27d, such that the cage 26 substantially surrounds each of the first electrical connectors 22 so as to provide electrical shielding between adjacent ones of the first electrical connectors 22 and other nearby electrical components. The cage 26 can include a plurality of EMI (electromagnetic interference) shielding fingers 35 at the front end 29a or an electromagnetic interference shielding gasket. The fingers 35 are configured to be received in an opening 37 of a panel 39. For instance, the opening 37 can extend through the panel 39 along the longitudinal direction L. The panel 39 can be electrically conductive or alternatively constructed as desired. The fingers 35 can extend from the outermost side walls 27c with respect to the lateral direction A, the upper wall 27a, or a combination thereof. Thus, each of the first electrical connector 22 and the cage 26 can be supported by the panel 39, and can extend from a first side 39a of the panel 39. The electrical connector assembly 20 can further include the panel 39 in accordance with certain embodiments.

The electrical device 23, and in particular the second electrical connector 24, is configured to be mated with the first electrical connector 22. For instance, the second electrical connector 24 is configured to be inserted into the retention void 27d in the rearward direction toward the first electrical connector 22 until the first and second electrical connectors 22 and 24 are mated to each other. Thus, the rearward direction can define an insertion direction whereby the second electrical connector 24 is inserted into the cage 26 so as to mate with the first electrical connector 22. The insertion direction can further be referred to as a mating direction with respect to the second electrical connector 24, as the second electrical connector 24 moves in the rearward direction with respect to the first electrical connector 22 when the first and second electrical connectors 22 and 24 are mated to each other. The mating direction of the first electrical connector 22 can be defined in the forward direction, as the first electrical connector 22 moves in the forward direction with respect to the second electrical connector 24 when the first and second electrical connectors 22 and 24 are mated to each other. When the first and second electrical connectors 22 and 24 are mated to each other, the at least one conductive cable 25 is placed in optical communication with the substrate 43. As will be described in more detail below, the electrical connector assembly 20 can include a polarization member that is configured to allow the second electrical connector 24 to mate with the first electrical connector 22 only when the second electrical connector 24 is inserted into the retention void 27d in a predetermined orientation.

Figure 2A:
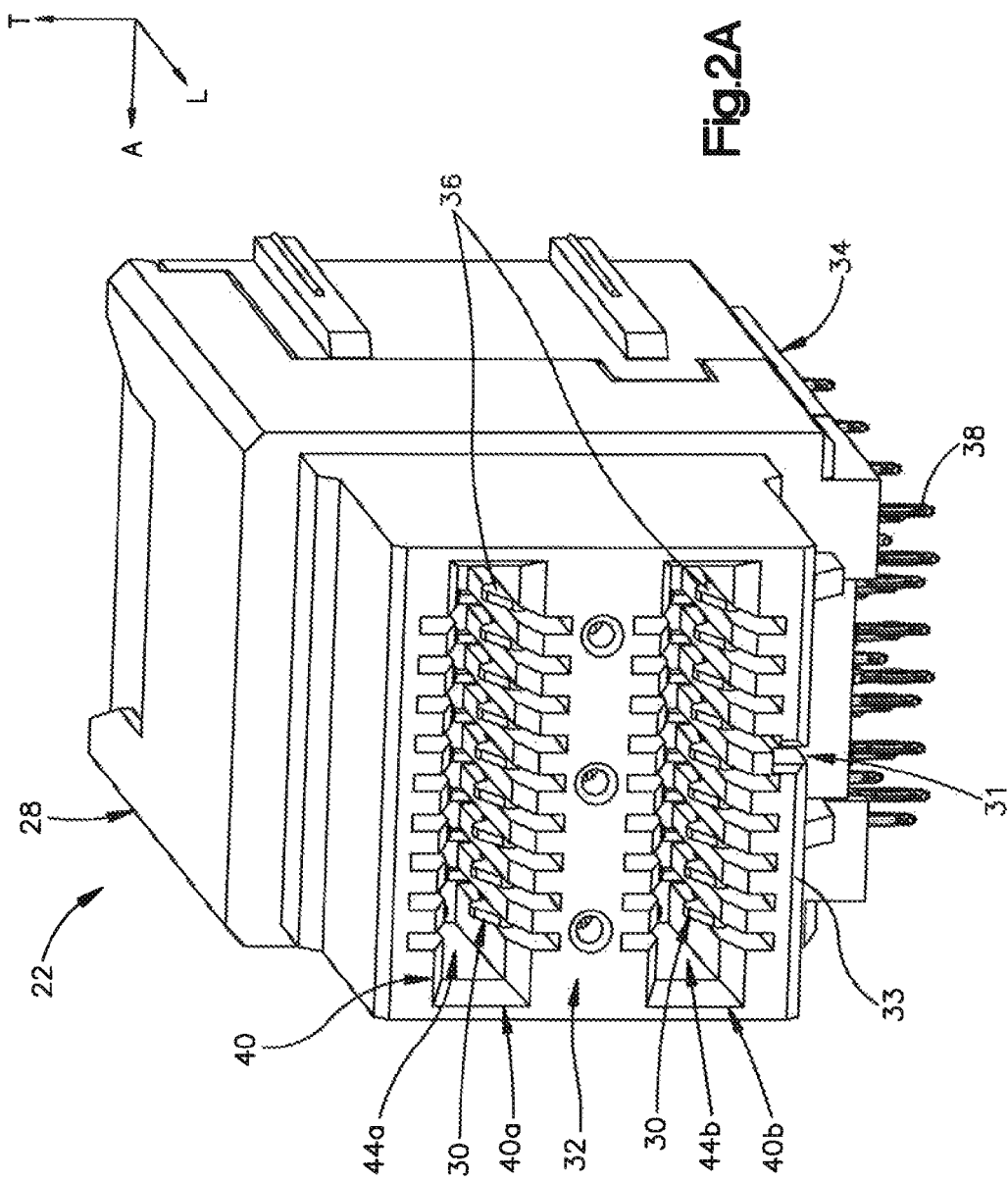
FIG. 2A is a perspective view of a first electrical connector of an electrical connector assembly constructed in accordance with one embodiment.

Referring now to FIG. 2A, the first electrical connector 22 can include a dielectric or electrically insulative connector housing 28 and a plurality of electrical conductors 30 supported by the connector housing 28. The connector housing 28 can define a mating interface 32 that is configured to mate with a complementary mating interface of the second electrical connector 24 as described in more detail below, and a mounting interface 34 configured to be mounted to a complementary electrical component such as the substrate 43, which can be configured as a printed circuit board. For instance, the mating interface 32 can define a receptacle that can be configured to receive a plug of the complementary second electrical connector 24 so as to place the first electrical connector 22 in electrical communication with the second electrical connector 24.

Figure 3A:
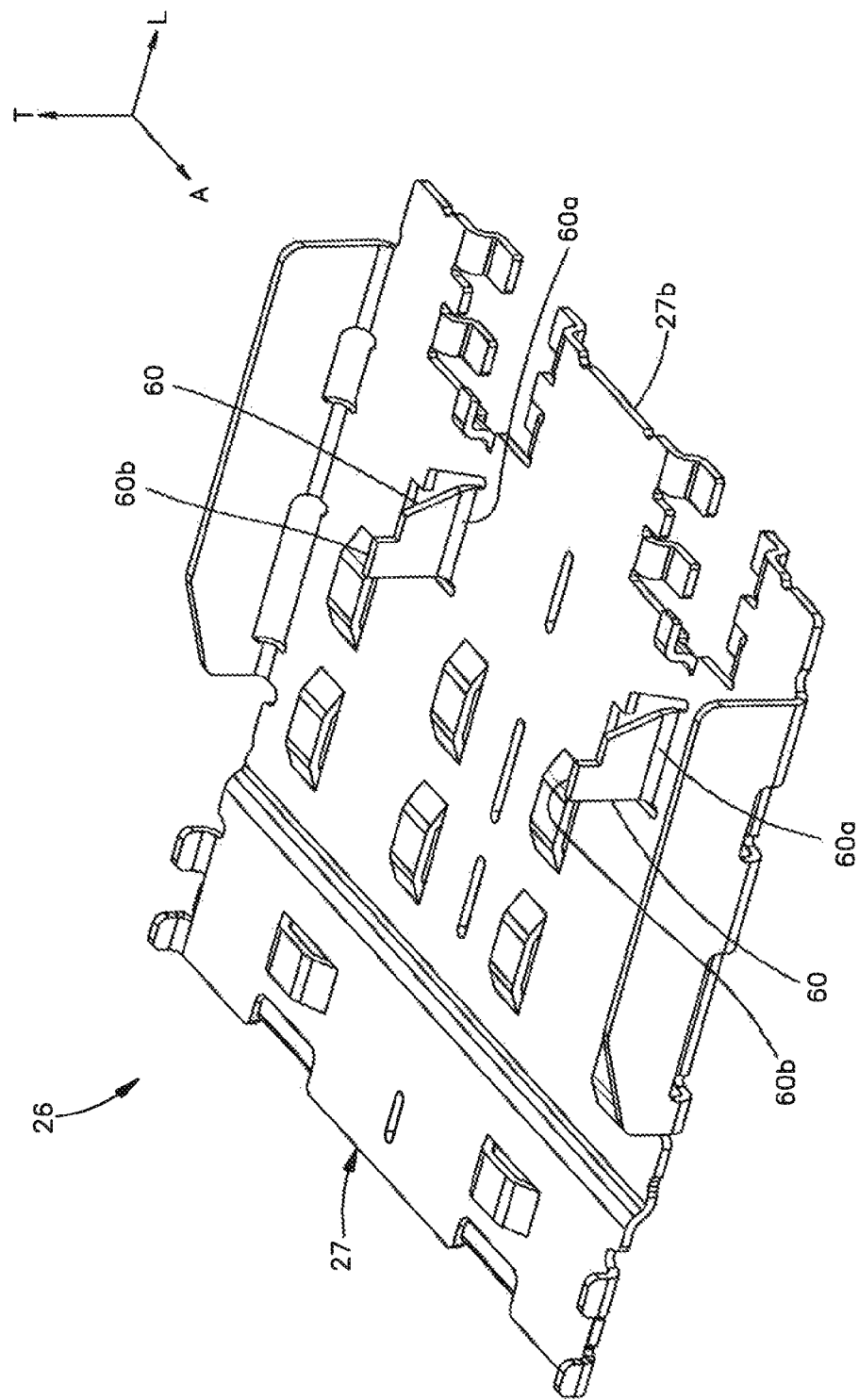
FIG. 3A is a perspective view of a portion of an EMI shielding cage of the electrical connector assembly.
Figure 3B:
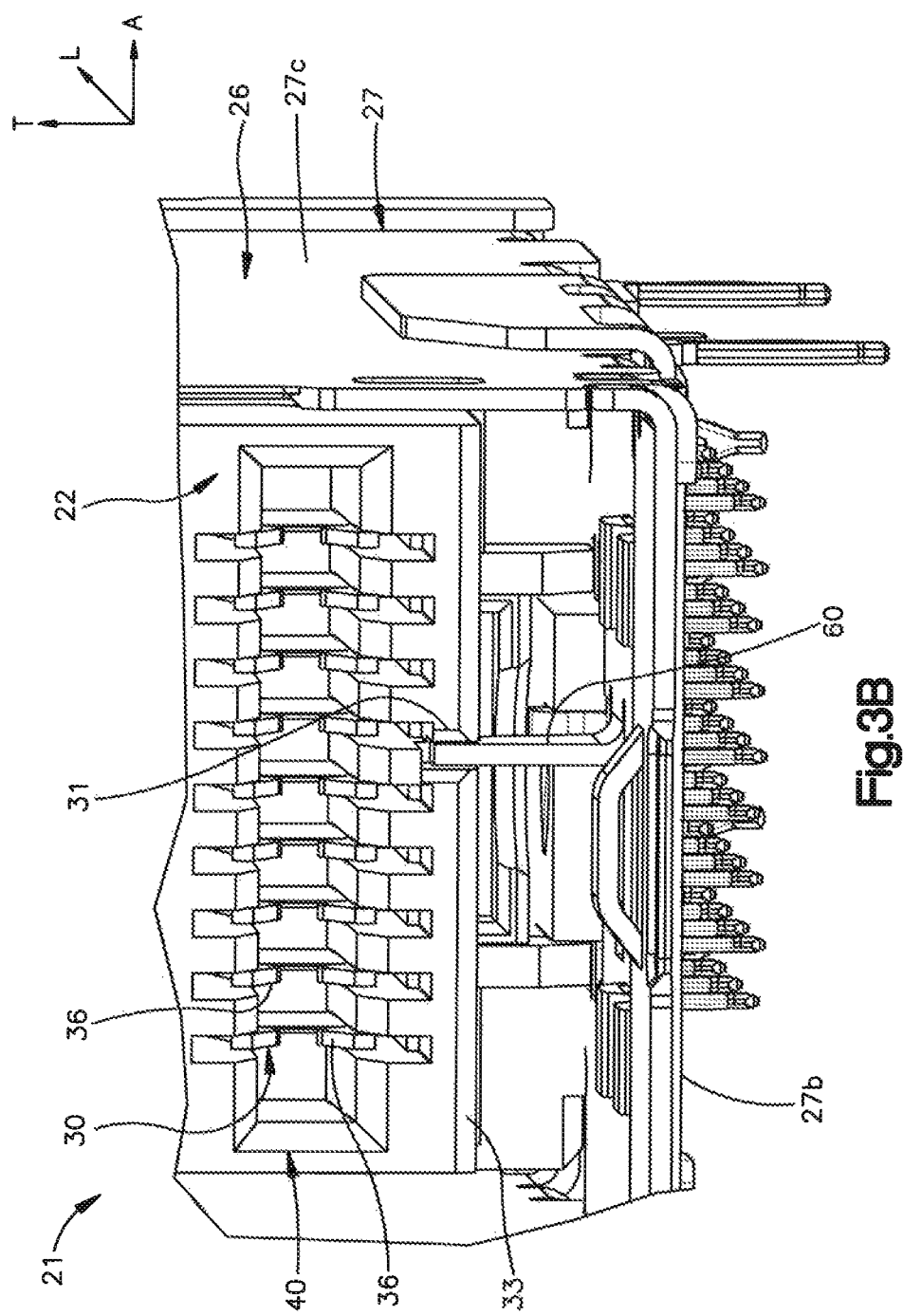
FIG. 3B is a front perspective view of the first electrical component illustrated in FIG. 1A.

The first electrical connector 22 can define an aperture 31 that extends at least into the connector housing 28 and, as described in more detail below, can be sized to receive a polarization tab 60 of the EMI shielding cage 26 (see FIGS. 3A-3C). The connector housing 28 defines a housing base 33 that, in turn, defines a lower surface that faces a downward direction such that at least a portion or an entirety of the lower surface faces the underlying substrate 43 when the first electrical connector 22 is mounted to the substrate 43. The downward direction can be oriented along the transverse direction T. The mating interface 32 can be configured as a nose, such that the lower surface of the base 33 at the nose is raised with respect to the lower surface of the base 33 at the mounting interface 34. Thus, when the first electrical connector 22 is mounted to an underlying substrate 43, the lower surface of the base 33 at the mating interface 32 is spaced from the underlying substrate 43 a first distance that is greater than a second distance that the lower surface of the base 33 at the mounting interface 34 is spaced from the underlying substrate 43. Otherwise stated, the lower surface of the base 33 at the mating interface 32 is offset from the lower surface of the base 33 at the mounting interface 34 in an upward direction opposite the downward direction along a transverse direction T.

The cage body 27 is configured to at least substantially surround the first electrical connector 22, and in particular the connector housing 28. For instance, the cage body 27 is configured to at least partially overlay the sides of the connector housing 28, the housing base 33 of the connector housing 28, and the upper wall of the connector housing 28. In one example, the cage 26 can at least substantially surround the mating interface 32. For instance, the base 27b of the cage 26 can overlap at least the nose with respect to the transverse direction T. The cage body 27 is further configured to at least substantially surround the second electrical connector 24 when the second electrical connector 24 is mated with the first electrical connector 22. Thus, the base 27b of the cage body 27 can be disposed between the underlying substrate 43 and each of the first and second electrical connectors 22 and 24 when the second electrical connector 24 is mated with the first electrical connector 22. The base 27b thus defines a lower end that faces the underlying substrate, and an upper end that faces the first and second electrical connectors and 24 when the second electrical connector 24 is mated with the first electrical connector 22.

The aperture 31 can extend into the base 33 in the upward direction, or can extend into any suitable alternative surface of the connector housing 28 as desired, for instance one of the sides of the connector housing 28 that faces the lateral direction A, or the upper wall of the connector housing 28 that faces the upward direction. For instance, the aperture 31 can extend into the connector housing 28 at the mating interface 32, and in particular into the base 33 at the mating interface 32. The first electrical connector 22 can include more than one aperture 31 that extends into one or more of the surfaces of the housing 28. The aperture 31 can further extend along the rearward direction through the mating interface 32 so as to be open at the mating interface 32 with respect to the forward direction, or can be closed by the connector housing 28 with respect to the forward direction. In accordance with one embodiment, the connector housing 28 defines a seat 41 (see FIG. 3C) that can be configured to abut a polarization tab 60 of the cage 26 as described in more detail below. The seat 41 can at least partially define the aperture 31. For instance, the seat 41 can define a rearward-most end of the aperture 31. Thus, the seat 41 can face an open end of the aperture along the forward direction.

Each of the electrical conductors 30 can define a respective mating end 36 and a mounting end 38 opposite the mating end 36. The first electrical connector 22 can define at least one receptacle 40 that extends into the connector housing 28 in the rearward direction. For instance, the at least one receptacle can extend into the connector housing 28 at the mating interface 32. In one example, the connector housing 28 can define an upper receptacle 40a and a lower receptacle 40b that is spaced from the upper receptacle 40a in the downward direction. For instance, the upper receptacle 40a can house a first plurality of the mating ends 36 and is configured to receive a respective first plurality of electrical conductors of the second electrical connector 24. Similarly, the lower receptacle 40b can house a second plurality of the mating ends 36 and is configured to receive a respective second plurality of electrical conductors of the second electrical connector 24. In accordance with the illustrated embodiment, the mating ends 36 can terminate within the connector housing 28, and in particular within the receptacles 40a and 40b, though they could alternatively extend out from the connector housing 28 as desired.

The mating ends 36 of the electrical conductors 30 can be arranged in one or more rows 42 that are elongate along the lateral direction A. The electrical conductors 30 can define a gap disposed between adjacent ones of the rows 42 that are spaced from each other along a transverse direction T. For instance, each of the first and second receptacles 40a and 40b can contain a respective pair of rows 42 of mating ends 36. The pair of rows 42 of the first plurality of mating ends 36 can define an upper gap or a first gap 44a in the first receptacle 40a. Similarly, the pair of rows 42 of the second plurality of mating ends 36 can define a lower gap or a second gap 44b in the second receptacle 40b. The gaps 44a and 44b can be configured as receptacles that are configured to receive electrical conductors of the second electrical connector 24, such that the electrical conductors of the second electrical connector 24 are in physical and electrical contact with respective ones of the mating ends 36 of the first electrical connector 22 when the first and second electrical connectors 22 and 24 are mated to each other. The mating ends 36 can be oriented generally along the longitudinal direction L.

The mounting ends 38 can be oriented perpendicular with respect to the mating ends 36, such that the electrical conductors 30 are configured as right-angle conductors. Thus, the first electrical connector 22 can be referred to as a right-angle electrical connector. For instance, the mounting ends 38 can extend in the downward direction from the connector housing 28. Thus, the mating interface 32 can be oriented perpendicular with respect to the mounting interface 34. For instance, the mating interface 32 can be oriented along the lateral and transverse directions, and the mounting interface 34 can be oriented along the lateral and longitudinal directions. Alternatively, the first electrical connector 22 can be configured as a vertical electrical connector whereby the mounting ends 38 are oriented generally parallel with respect to the mating ends 36. Thus, the mounting interface 34 is oriented parallel with respect to the mating interface 32. For instance, each of the mounting interface 34 and the mating interface 32 can be oriented along the lateral and transverse directions.

The mounting ends 38 can be configured to be placed in electrical communication with the underlying substrate 43 to which the first electrical connector 24 is mounted in any manner as desired. For instance, the mounting ends 38 can be configured as press-fit tails configured to be inserted into respective plated vias of the substrate. Alternatively, the mounting ends 38 can be surface mounted or otherwise mounted to the substrate to place the electrical conductors 30 in electrical communication with electrically conductive traces of the substrate. The cage 26 can similarly be mounted to the underlying substrate 43. For instance, the cage 26 can include press-fit tails that are configured to be inserted into complementary apertures of the substrate 43. Alternatively, the cage 26 can be mounted to the substrate 43 in any suitable manner as desired.

Referring now to FIG. 29, the second electrical connector 24 can be configured as a Mini SAS HD connector or a Mini SAS connector. The second electrical connector 24 can alternatively be configured as an SFP or SFP+ optical transceiver module, or any suitable alternative device, such as a QSFP+ or CXP electrical device. The conductive cables 25 that are in electrical communication with the second electrical connector 24 can be optically conductive. In one embodiment, the conductive cables 25 can be electrically conductive. For instance, the conductive cables 25 can be made from copper. The second electrical connector 24 can include a dielectric or electrically insulative connector housing 46 that defines a mating interffice 48 and a mounting interface 50. The second electrical connector 24 further includes a plurality of electrical conductors 52 that are supported by the housing 46, for instance at the mating interface 48. As described above, the cage body 27 is configured to at least substantially surround the second electrical connector 24, and in particular the connector housing 46, when the second electrical connector 24 is mated to the first electrical connector 22. For instance, the cage body 7 is configured to at least partially overlay the sides of the connector housing 46, the bottom wall of the connector housing 46, and the upper wall of the connector housing 46.

In accordance with the illustrated embodiment, the second electrical connector 24 can include at least one printed circuit board that is supported by the connector housing 46 at the mating interface 48. For instance, the second electrical connector 24 can include an upper printed circuit board or a first printed circuit board 54a. The second electrical connector 24 can further include a lower printed circuit board or a second printed circuit board 54b that is spaced from the first printed circuit board 54a in the downward direction. The first and second printed circuit boards 54a and 54b can be supported by the connector housing 46 proximate to the mating interface 48. The first printed circuit board 54a can be in communication with a first one of the conductive cables 25, and the second printed circuit board 54b can be in communication with a second one of the conductive cables 25. The first and second printed circuit boards 54a and 54b can include a dielectric or electrically insulative substrate body 56 and at least one such as a plurality of electrical conductors in the form of electrically conductive traces that are supported by the substrate body 56.

The at least one conductive cable 25 can be supported by the connector housing 46 at the mounting interface 50. For instance, the cable 25 can extend through the housing 46 at the mounting interface 50, and can be electrically connected to the electrical conductors 52 of respective ones of the first and second printed circuit boards 54a and 54b in the connector housing 46. Each of the printed circuit boards 54a and 54b can define a respective mating end that is configured as a plug so as to be received in the first and second gaps 44a and 44b at the mating interface 32 of the first electrical connector 22. Accordingly, contact pads 58 of the printed circuit boards 54a and 54b that are in electrical communication with respective ones of the electrical traces carried by the respective substrate body 56, can contact the mating ends 36 of the electrical conductors 30 of each of the first and second pairs of rows when received in the respective first and second gaps 44a and 44b. The mating interface 48 of the connector housing 46 can be configured to receive at least a portion of the housing 28 of the first electrical connector as the gaps receive the respective printed circuit board 54a and 54b in the rearward direction.

The first electrical connector 22 configured to be mated with the second electrical connector 24 such that the first electrical connector 22 moves relative to the second electrical connector in the forward direction, which can be along the longitudinal direction L. Thus, 1) the first electrical connector 22 can be moved relative to the second electrical connector 24 in the forward direction, 2) the second electrical connector 24 can be moved relative to the first electrical connector in the rearward direction, or 3) the first electrical connector 22 can be moved relative to the second electrical connector 24 in the forward direction, and the second electrical connector 24 can be moved relative to the first electrical connector 22 in the rearward direction. In each instance, the first electrical connector 22 is moved relative to the second electrical connector 24 in the forward mating direction whether the first electrical connector 22 moves relative to the second electrical connector 24 while the second electrical connector remains stationary, the second electrical connector 24 moves relative to the first electrical connector 22 while the first electrical connector 22 remains stationary, or both the first and second electrical connectors 22 and 24 move with respect to the other such that neither of the first and second electrical connectors 22 and 24 remains stationary.

The second electrical connector 24 can a polarization slot 59 that extends into the housing 46 of the second electrical connector 24. For instance, the polarization slot 59 can extend into the mating interface 48 in the forward direction, or can extend into the housing 46 at any suitable alternative location as desired. The polarization slot 59 positioned to receive the polarization tab 60 of the cage 26 only when the second electrical connector 24 is mated to the first electrical connector 22 in the predetermined orientation with respect to the first electrical connector 22. Thus, it can be said that the polarization tab 60 ember is received by the second electrical connector 24 only when the second electrical connector 24 is mated to the first electrical connector 22 while in the predetermined orientation. When the first electrical connector 22 is in a second orientation other than the predetermined orientation with respect to the first electrical connector 22, the connector housing 46 will abut the polarization tab 60 before the first and second electrical connectors 22 and 24 are mated to each other. In certain embodiments, when the first electrical connector 22 is in the second orientation, the connector housing 46 will abut the polarization tab 60 before the mating interfaces of the first and second electrical connectors 22 and 24 touch each other.

Thus, it will be appreciated that the polarization slot 59 is aligned with the polarization tab 60 along the longitudinal direction L only when the first electrical connector 22 is in the predetermined orientation with respect to the first electrical connector 22. The polarization slot 59 can extend into a lower end of the connector housing 46 at the mating interface 48, or can extend into the housing 46 at any suitable alternative location as desired so as to be positioned to receive the polarization tab 60 only when the first and second electrical connectors 22 and 24 are in the predetermined orientation. The predetermined orientation is such that the first or upper printed circuit board 54a is aligned with only the first or upper gap 44a, and not the lower gap 44b, along the longitudinal direction L, and the second or lower printed circuit board 54b is aligned with only the second or lower gap 44b, and not the upper gap 44a, along the longitudinal direction L. As will be described in more detail below, the connector housing 46 can be positioned to urge the polarization tab 60 against the connector housing 28 of the first electrical connector 22 when the second electrical connector 24 is in the second orientation.

Referring now to FIGS. 1A-2C generally, and as described above, the electrical connector assembly 20 can include at least one first electrical connector 22 and at least one second electrical connector 24. For instance, ones of the second electrical connector 24 can be individually inserted into one or more respective cages 26 from a second side 39b of the panel 39 that is opposite the first side 39a, no as to mate with respective ones of the first electrical connector 22 in the manner described above. Alternatively, the electrical connector assembly 20 can include a plurality (e.g., two or more) of first electrical connectors 22 disposed in the same cage 26. Further, as illustrated in FIG. 2C, the electrical device 23 can include a plurality (e.g., two or more) of second electrical connectors 24 whose respective mating interfaces 48 are supported by a common connector housing 46. The mating interfaces 48 can be spaced from each other along the lateral direction A a distance corresponding to a distance between the mating interfaces 32 of the plurality of first electrical connectors 22. Accordingly, the plurality of first electrical connectors 22 can be simultaneously mated with the plurality of second electrical connectors 24. In one embodiment, the plurality of first electrical connectors 22 can be a pair of first electrical connectors 22, and the plurality of second electrical connectors 24 can be a pair of second electrical connectors 24.

As described above, the EMI shielding cage 26 includes a polarization member configured that can be configured as at least one polarization tab 60 that extends from the cage body 27 to a location that is aligned with the connector housing 28 along the longitudinal direction L. For instance, the at least one polarization tab 60 can extend from the cage body 27 to a location that is aligned with the connector housing 28 in the rearward direction. The cage 26 can include any number of polarization tabs 60, for instance at least one polarization tab that is aligned with a respective one of the connector housings 28 of each of the plurality of first electrical connectors 22. For instance, when the electrical connector assembly 20 includes one first electrical connector 22, the cage 26 can include one polarization tab 60, a pair of polarization tabs 60, or any number of polarization tabs 60 aligned with the housing 28 of the first electrical connector 22 as desired. When the electrical connector assembly 20 includes a pair of first electrical connectors 22, the cage 26 can include a pair of polarization tab 60, two pairs of polarization tabs 60, or any number of polarization tabs 60 aligned with each of the housings 28 of the pair of first electrical connectors 22 as desired, and so on. Each of the polarization tabs 60 can be disposed forward of the seat 41. The polarization tab 60 is positioned such that a portion of the connector housing 46 of the second electrical connector 24 slides past the polarization tab 60 when the first and second electrical connectors are mated with each other in the mating direction when the second electrical connector 24 is in the predetermined orientation with respect to the first electrical connector 22. The polarization tab 60 is positioned to interfere with the second electrical connector 24 so as to abut the second electrical connector 24, and in particular the housing 46, and prevent the second electrical connector 24 from mating with the first electrical connector 22 when the second electrical connector 24 is in the second orientation. For instance, the polarization tab 60 can be positioned to be received in the second electrical connector 24, for instance in the polarization slot 59 when the first and second electrical connectors 22 and 24 are mated with each other when the second electrical connector 24 is in the predetermined orientation with respect to the first electrical connector 22.

As described above, the polarization tab 60 is aligned with the connector housing 28 in the longitudinal direction L. The polarization tab 60 can be disposed adjacent the seat 41 such that when the second electrical connector 24 is moved into the retention void 27d in the mating direction while in the second orientation, the second electrical connector 24, and in particular the connector housing 46, is configured to contact the polarization tab 60 so as to prevent the second electrical connector 24 from further advancing in the retention void 27d toward the first electrical connector 22. Thus, the abutment of the second electrical connector 24 with the polarization tab 60 prevents the second electrical connector 24 from mating with the first electrical connector 22. The connector housing 46 at the mating end 48 can be configured to abut the polarization tab 60 when the second electrical connector 24 is in the second orientation with respect to the first electrical connector 22. Further, the second electrical connector 24 can bias the polarization tab 60 against the connector housing 46 when the second electrical connector is inserted into the retention void 27d in the mating direction while in the second orientation. For instance, the connector housing 46 is configured to contact the polarization tab 60 and bias the polarization tab 60 against the seat 41. In one example, the polarization tab 60 can be spaced from the seat 41 in the forward direction a sufficient distance such that when the second electrical connector 24 is moved into the retention void 27d in the mating direction in the second orientation, the second electrical connector 24, and in particular the connector housing 46, is configured to contact the polarization tab 60 and bias the polarization tab 60 against the connector housing 46. Alternatively, polarization tab 60 can abut the seat 41 prior to contact with the connector housing 46. It should be appreciated that the seat 41 can provide structural support to the polarization tab 60 so as to prevent the polarization tab 60 from buckling or otherwise being displaced a sufficient amount such that the second electrical connector 22 can contact the first electrical connector 24 while in the second orientation.

It can be said that the electrical connector assembly 20 further includes the polarization member in the form of the polarization tab 60. The polarization tab 60 can be supported by the cage body 27. For instance, the polarization tab can be monolithic with the cage body 27, or can be otherwise attached to the cage body 27 in any manner desired. The polarization tab 60 defines a first end 60a that is supported by the cage body 27. For instance, the first end 60a can be monolithic with the cage body 27 or can be attached to the cage body 27 in any manner desired. The polarization tab 60 can further include a second end 60b spaced from the first end 60a. At least a portion of the polarization tab 60 between the first and second ends 60a and 60b can be aligned with the connector housing 28 along the longitudinal direction T. For instance, the least a portion of the polarization tab 60 between the first and second ends 60a and 60b can be aligned with the seat 41 of the connector housing 28 in the longitudinal direction L. In one example, the at least a portion of the polarization tab 60 can be disposed in the aperture 31. Thus, the polarization tab 60 extends from the cage body 27 to the location that is aligned with the connector housing 28 in the rearward direction. While the polarization member has been described above as a polarization tab 60 in accordance with one example, it should be appreciated that the polarization member can be alternatively constructed as desired, unless otherwise indicated.

The at least one polarization tab 60 can extend from any respective one of the upper wall 27a, the base 27b, and one or both of the side walls 27c. Thus, the second end 60b can extend into the retention void 27d from the cage body 27. In this regard, it should be appreciated that the seat 41 can be defined by the housing base 33 of the connector housing 28, an upper wall opposite the housing base 33 in the transverse direction T, or one or both of side walls of the connector housing 28 that extend between the upper wall and the housing base 33. Thus, it should be appreciated that the second end 60b can be offset from the first end 60a along the transverse direction T, for instance, when the polarization tab 60 is supported by one of the upper wall 27a and the base 27b. In one example, the second end 60b can be aligned with the first end 60a along the transverse direction T, for instance when the polarization tab 60 is supported by one of the upper wall 27a and the base 27b. The second end 60b can be offset from the first end 60a in the upward direction when the polarization tab 60 is supported by the base 27b. The second end 60b can be offset from the first end 60a in the downward direction when the polarization tab 60 is supported by the upper wall 27a. It should be appreciated that the second end 60b can be offset from the first end 60a along the lateral direction A, for instance, when the polarization tab 60 is supported by one of the side walls 27c. In one example, the second end 60b can be aligned with the first end 60a along the lateral direction A, for instance when the polarization tab 60 is supported by one of the side walls 27c. The polarization tab can extend in the longitudinal direction L a distance greater than the thickness of the cage body 27. The thickness of the cage body 27 can be measured between opposed surfaces of the cage body 27 along a direction normal to the cage body 27. For instance, the polarization tab 60 can extend from the base 27b, and the thickness of the cage body 27 at the base 27b can be defined in the transverse direction T.

It should be appreciated that methods can be provided for mating the first electrical connector 22 with the second electrical connector 24. The method can include the steps of inserting the polarization tab 60 into the housing 46 of the second electrical connector 24 when the second electrical connector 24 is in the predetermined orientation with respect to the first electrical connector 22. The step of inserting can further include the step of receiving the polarization tab in the polarization slot 59 of the second electrical connector 24. The method can include the alternative step of preventing the second electrical connector 24 from mating with the first electrical connector when the second electrical connector 24 is in the second orientation. For instance, the preventing step can include the step of causing the second electrical connector 24 to abut the polarization tab 60 when second electrical connector 24 is in the second orientation other than the predetermined orientation with respect to the first electrical connector 22. For example, the second electrical connector 24, such as the connector housing 46, can bias the polarization tab 60 against the connector housing 28, for example the seat 41, when second electrical connector 24 is in the second orientation other than the predetermined orientation with respect to the first electrical connector 22.

In one embodiment, the connector housing 46 can bias the polarization tab 60 against the connector housing 28, for example the seat 41, when second electrical connector 24 is in the second orientation.

The embodiments described in connection with the illustrated embodiments have been presented by way of illustration, and the present invention is therefore not intended to be limited to the disclosed embodiments. Furthermore, the structure and features of each the embodiments described above can be applied to the other embodiments described herein, unless otherwise indicated. Accordingly, those skilled in the art will realize that the invention is intended to encompass all modifications and alternative arrangements included within the spirit and scope of the invention, for instance as set forth by the appended claims.

What is claimed is:

1. An electrical connector assembly comprising:
   a first electrical connector including a connector housing and a plurality of electrical conductors supported by the connector housing, the first electrical connector movable relative to a second electrical connector in a forward mating direction so as to mate with the second electrical connector; and
   an EMI shielding cage that includes a cage body that at least substantially surrounds the connector housing, the EMI shielding cage including a polarization tab that extends from the cage body,
   wherein the polarization tab:
     comprises an upward fold of a flap partially cut from the cage body;
     is aligned with the connector housing;
     is positioned to be received by the second electrical connector when the second electrical connector is mated with the first electrical connector when the second electrical connector is in a predetermined orientation with respect to the first electrical connector,
     is positioned to interfere with a housing of the second electrical connector so as to prevent the second electrical connector from mating with the first electrical connector when the second electrical connector is in a second orientation with respect to the first electrical connector, the second orientation being different than the predetermined orientation with respect to the first electrical connector.

2. The electrical connector assembly as recited in claim 1, wherein the cage body that at least substantially surrounds the first electrical connector, and the polarization tab is monolithic with the cage body.

3. The electrical connector assembly as recited in claim 1, wherein the connector housing defines a mating interface configured to mate with the second electrical connector and a mounting interface configured to be mounted to an underlying substrate.

4. The electrical connector assembly as recited in claim 3, wherein the cage body defines a base that is configured to be disposed between the connector housing and the substrate when the first electrical connector is mounted to the underlying substrate, and the polarization tab extends up from the base to the location aligned with the connector housing.

5. An electrical connector assembly comprising:
   a first electrical connector including a connector housing and a plurality of electrical conductors supported by the connector housing, the first electrical connector movable relative to a second electrical connector in a forward mating direction so as to mate with the second electrical connector; and an EMI shielding cage that includes a cage body that at least substantially surrounds the connector housing, the EMI shielding cage including a polarization tab that extends from the cage body, wherein the connector housing defines an aperture, and the polarization tab extends into the aperture so as to be aligned with a surface of the connector housing that at least partially defines the aperture.

6. The electrical connector assembly as recited in claim 5, wherein the polarization tab extends into a base of the connector housing.

7. The electrical connector assembly as recited in claim 6, wherein the base defines a lower surface that is configured to face an underlying substrate when the first electrical connector is mounted to the underlying printed circuit board.

8. The electrical connector assembly as recited in claim 7, wherein the lower surface of the connector housing faces a downward direction, and the electrical conductors define mounting ends that extends from the connector housing in the downward direction so as to be mounted to the underlying substrate.

9. The electrical connector assembly as recited in claim 5, wherein the aperture extends into the mating interface.

10. The electrical connector assembly as recited in claim 9, wherein the polarization tab extends from the cage body to the location that is aligned with the mating interface of the connector housing in the rearward direction.

11. The electrical connector assembly as recited in claim 1, further comprising the second electrical connector.

12. The electrical connector assembly as recited in claim 11, wherein the second electrical connector is an optical transceiver.

13. The electrical connector assembly as recited in claim 11, wherein the second electrical connector comprises a housing and at least one printed circuit board that is configured to be inserted into a gap between rows defined by mating ends of the electrical contacts of the first electrical connector so as to be placed in electrical communication with the electrical conductors of the first electrical connector.

14. The electrical connector assembly as recited in claim 11, wherein the second electrical connector defines a polarization slot that extends into the housing of the second electrical connector, the polarization slot positioned to receive the polarization tab only when the second electrical connector is mated to the first electrical connector in the predetermined orientation.

15. The electrical connector assembly as recited in claim 1, wherein the polarization tab abuts the connector housing.

16. The electrical connector assembly as recited in claim 11, wherein the housing of the second electrical connector is positioned to urge the polarization tab against the connector housing of the first electrical connector when the second electrical connector is in the second orientation.

17. The electrical connector assembly as recited in claim 14, wherein the housing of the second electrical connector defines a mating interface configured to mate with the first electrical connector, and the polarization slot extends into the mating interface of the second electrical connector along the forward mating direction.

18. A method of mating a first electrical connector and a second electrical connector, wherein the first electrical connector comprises a connector housing and a plurality of electrical conductors supported by the connector housing, the first electrical connector movable relative to the second electrical connector in a forward mating direction so as to mate with the second electrical connector; and the first electrical connector is part of an electrical connector assembly comprising an EMI shielding cage that includes a cage body that at least substantially surrounds the connector housing, the EMI shielding cage including a polarization tab that extends from the cage, wherein the polarization tab:

comprises an upward fold of a flap partially cut from the cage body;

is positioned to be received by the second electrical connector when the second electrical connector is mated with the first electrical connector when the second electrical connector is in a predetermined orientation with respect to the first electrical connector, is positioned to interfere with a housing of the second electrical connector so as to prevent the second electrical connector from mating with the first electrical connector when the second electrical connector is in a second orientation with respect to the first electrical connector, the second orientation being different than the predetermined orientation with respect to the first electrical connector, the method comprising:

inserting the polarization tab into the housing of the second electrical connector when the second electrical connector is in a predetermined orientation with respect to the first electrical connector, wherein the second electrical connector interferes with the polarization tab when second electrical connector is in a second orientation with respect to the first electrical connector, the second orientation different than the predetermined orientation with respect to the first electrical connector.

19. The method as recited in claim 18, wherein when the second electrical connector is in the second orientation, the method further comprises the step of causing the second electrical connector to bias the polarization tab against the connector housing of the first electrical connector.

* * * * *